(12) United States Patent
Diamond et al.

(10) Patent No.: US 12,651,262 B1
(45) Date of Patent: Jun. 9, 2026

(54) PANIC PIN

(71) Applicant: Coinbase, Inc., Oakland, CA (US)

(72) Inventors: Max Diamond, Leesburg, VA (US);
Bradley Wardman, Phoenix, AZ (US);
Jacqueline Crystal Winters,
Monument, CO (US)

( * ) Notice: Subject to any disclaimer, the term of this
patent is extended or adjusted under 35
U.S.C. 154(b) by 0 days.

(21) Appl. No.: 19/376,701

(22) Filed: Oct. 31, 2025

(51) Int. Cl.
*G06Q 20/40* (2012.01)
*G06Q 20/36* (2012.01)
*H04L 9/40* (2022.01)

(52) U.S. Cl.
CPC ......... *G06Q 20/4012* (2013.01); *G06Q 20/36*
(2013.01); *G06Q 20/405* (2013.01); *H04L*
*9/40* (2022.05); *G06Q 2220/00* (2013.01);
*H04L 2209/56* (2013.01)

(58) Field of Classification Search
CPC ...... G06Q 20/4012; G06Q 20/36; H04L 9/40;
H04L 9/50
See application file for complete search history.

(56) References Cited

U.S. PATENT DOCUMENTS

| | | | |
|---|---|---|---|
| 11,410,161 B1* | 8/2022 | Kurani ................. | G06Q 20/351 |
| 12,524,760 B2* | 1/2026 | Mukherji ............. | G06Q 20/386 |
| 2007/0241183 A1* | 10/2007 | Brown ............. | G06K 19/06187 |
| | | | 235/380 |
| 2022/0335422 A1* | 10/2022 | Pospieszalski .......... | G09C 1/00 |

* cited by examiner

*Primary Examiner* — Lizbeth Torres-Diaz
(74) *Attorney, Agent, or Firm* — Holland & Hart LLP

(57) ABSTRACT

Methods, systems, and devices for data management are
described. For example, a custodial platform entity may
receive, via a client application on a user device, a user input
including a first personal identification number (PIN). The
first PIN and a second PIN may be used to access a user
account associated with the client application that may
support at least one blockchain wallet. The custodial plat-
form entity may determine that the first PIN may be a panic
PIN associated with activation of a safety protocol associ-
ated with a user of the client application. The custodial
platform entity may transmit, based on the determination
and in accordance with the safety protocol, an indication that
notifies an external entity of a location of the user device.
The custodial platform entity may perform one or more
further actions based on the determination and in accordance
with the safety protocol.

20 Claims, 9 Drawing Sheets

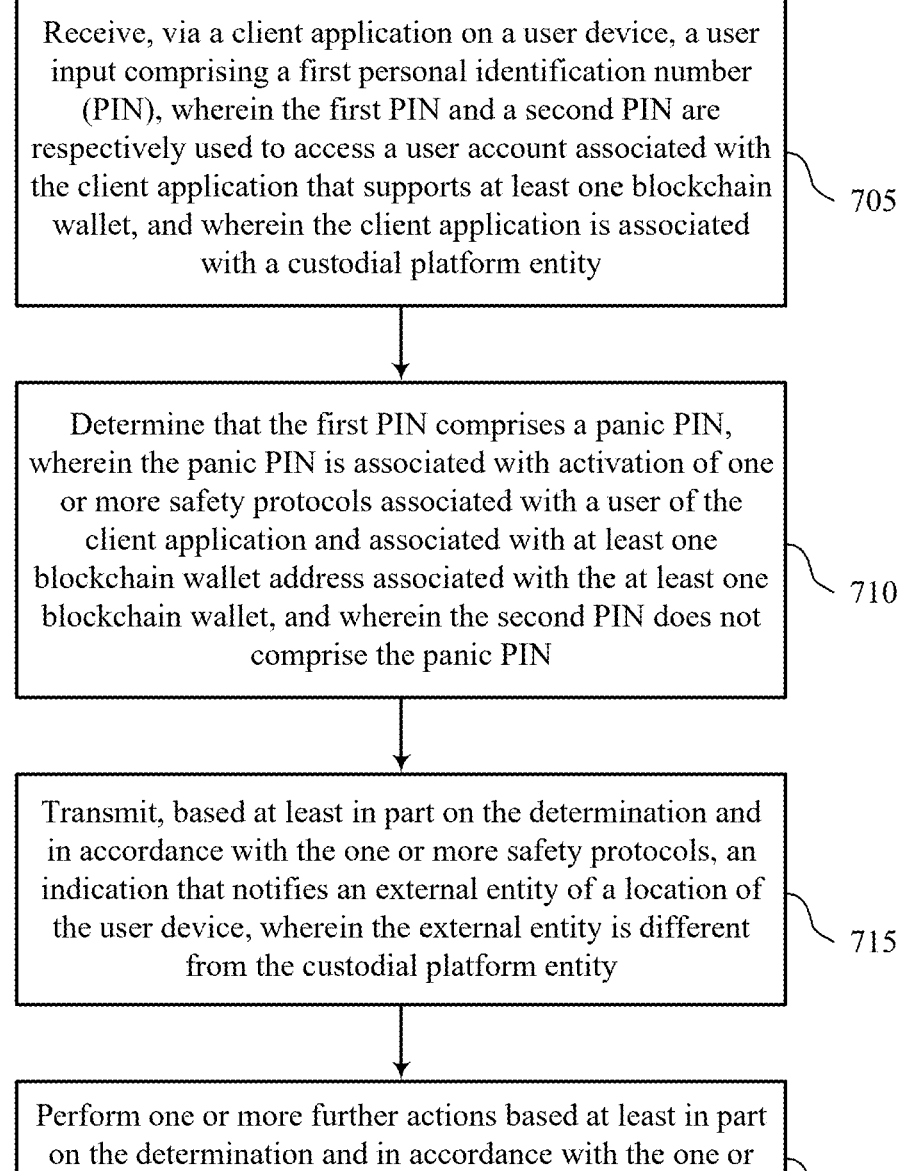

Receive, via a client application on a user device, a user input comprising a first personal identification number (PIN), wherein the first PIN and a second PIN are respectively used to access a user account associated with the client application that supports at least one blockchain wallet, and wherein the client application is associated with a custodial platform entity

705

Determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN

710

Transmit, based at least in part on the determination and in accordance with the one or more safety protocols, an indication that notifies an external entity of a location of the user device, wherein the external entity is different from the custodial platform entity

715

Perform one or more further actions based at least in part on the determination and in accordance with the one or more safety protocols

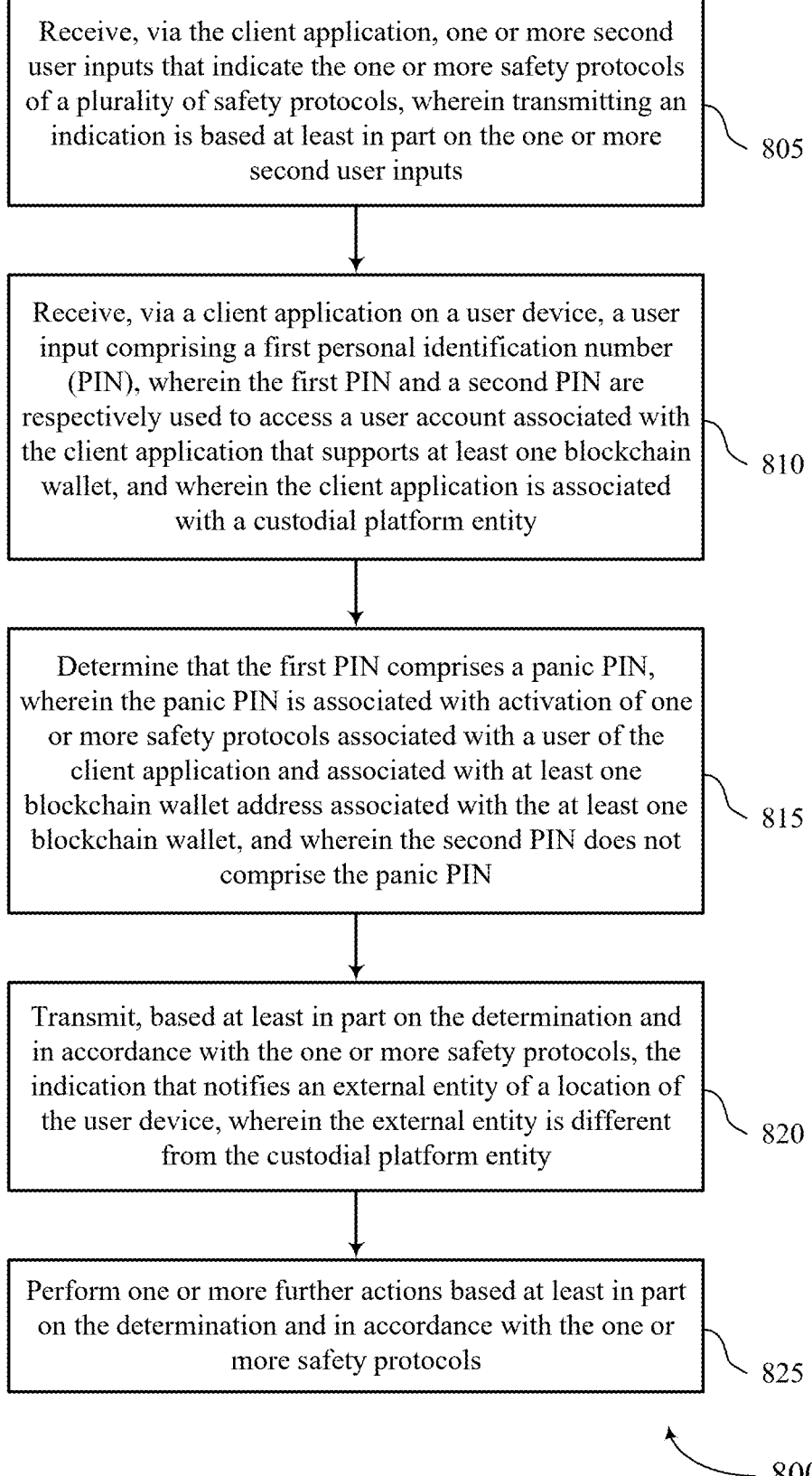

Receive, via the client application, one or more second user inputs that indicate the one or more safety protocols of a plurality of safety protocols, wherein transmitting an indication is based at least in part on the one or more second user inputs

805

Receive, via a client application on a user device, a user input comprising a first personal identification number (PIN), wherein the first PIN and a second PIN are respectively used to access a user account associated with the client application that supports at least one blockchain wallet, and wherein the client application is associated with a custodial platform entity

810

Determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN

815

Transmit, based at least in part on the determination and in accordance with the one or more safety protocols, the indication that notifies an external entity of a location of the user device, wherein the external entity is different from the custodial platform entity

820

Perform one or more further actions based at least in part on the determination and in accordance with the one or more safety protocols

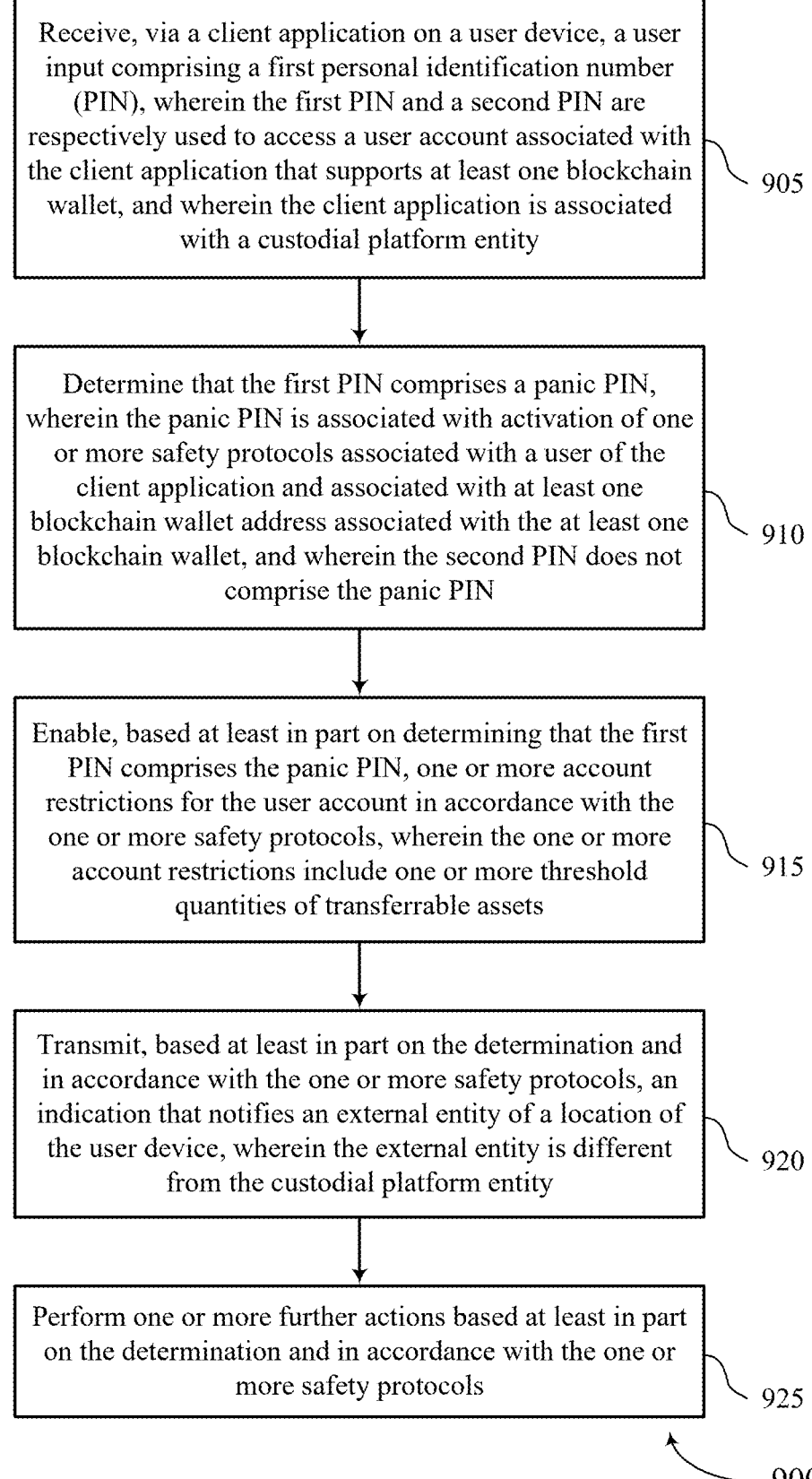

Receive, via a client application on a user device, a user input comprising a first personal identification number (PIN), wherein the first PIN and a second PIN are respectively used to access a user account associated with the client application that supports at least one blockchain wallet, and wherein the client application is associated with a custodial platform entity

905

Determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN

910

Enable, based at least in part on determining that the first PIN comprises the panic PIN, one or more account restrictions for the user account in accordance with the one or more safety protocols, wherein the one or more account restrictions include one or more threshold quantities of transferrable assets

915

Transmit, based at least in part on the determination and in accordance with the one or more safety protocols, an indication that notifies an external entity of a location of the user device, wherein the external entity is different from the custodial platform entity

920

Perform one or more further actions based at least in part on the determination and in accordance with the one or more safety protocols

PANIC PIN

FIELD OF TECHNOLOGY

The present disclosure relates generally to data management, including techniques for a panic personal identification number (PIN).

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIGS. 7 through 9 show flowcharts illustrating methods that support a panic PIN in accordance with aspects of the present disclosure.

DETAILED DESCRIPTION

Figure 1:
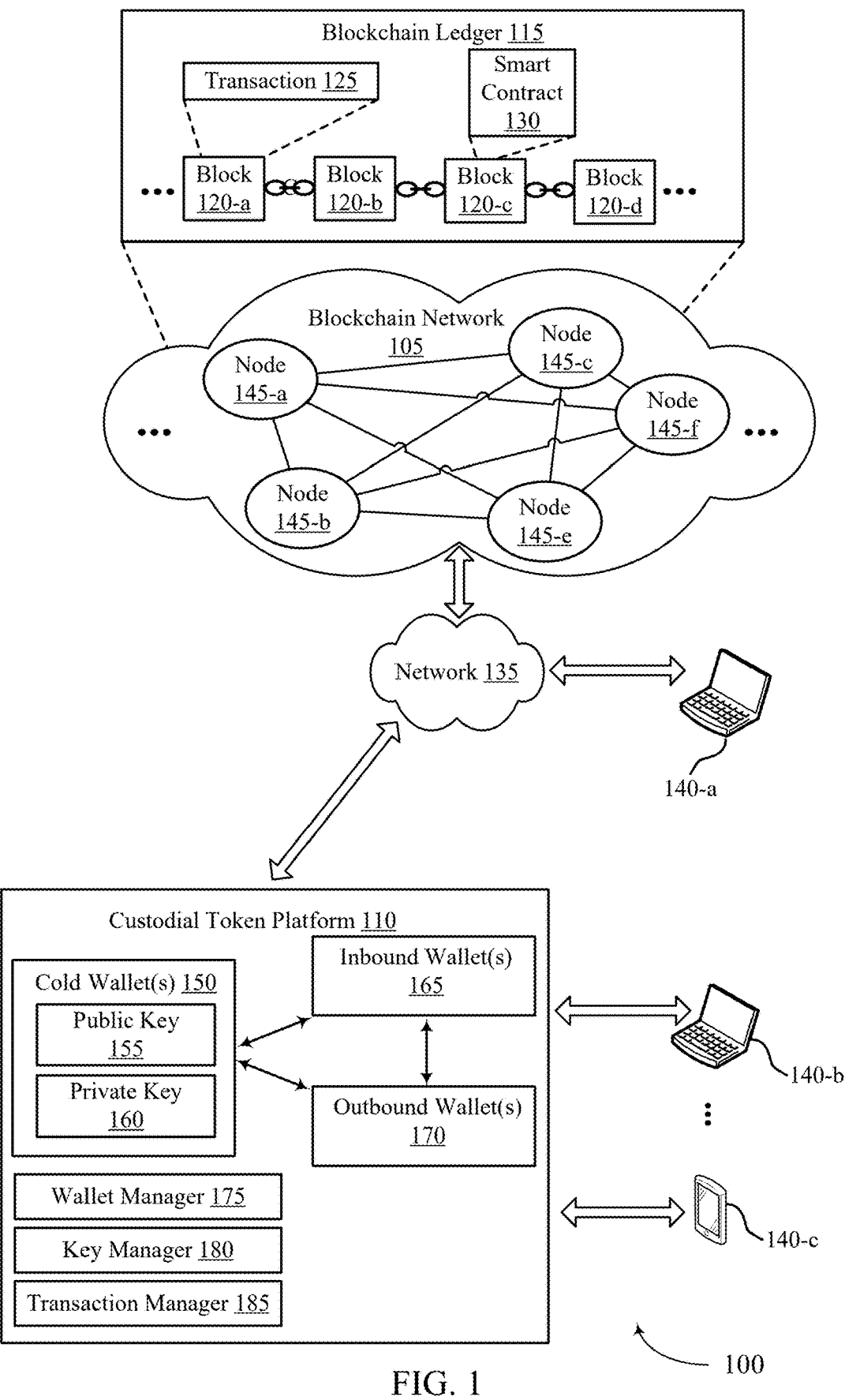
FIG. 1 illustrates an example of a computing environment that supports a panic personal identification number (PIN) in accordance with aspects of the present disclosure.

Cryptocurrency theft may occur in virtual environments or in physical environments. To prevent virtual attacks or scams, security systems and safeguards may be in place to prevent thefts and scams, warn users of potential scams, or the like. However, users (e.g., account holders, customers, asset holders) may also be targeted in physical environments and forced to transfer assets such as cryptocurrency to attackers. For example, users may be vulnerable to coercion, robbery, abduction, physical harm, or any combination thereof. Security tools, such as application locks and biometric account locks, may be limited in protecting users, as well as user assets, in these situations. There may not be a discreet and effective security mechanism to protect users from physical threats and unauthorized access to their cryptocurrency accounts.

The techniques described herein support a panic personal identification number (PIN) for accessing a user account within a client application associated with a custodial platform entity (e.g., a cryptocurrency platform). A user may configure a panic PIN and a normal PIN, both of which may allow access to a user account. The normal PIN may be used for everyday use, and may allow access to the user account without extra safety protocols. However, if the user inputs a panic PIN, one or more safety protocols may be triggered. The panic PIN may allow access to the user account or a modified user account to avoid alerting an attacker of the triggered safety protocols. For example, the user may input the panic PIN. The client application, or the custodial platform entity via the client application, may identify the panic PIN and may send a notification that the panic PIN was input to one or more external security entities (e.g., law enforcement, private security), as well as an indication of the location of the user. In some cases, the user may configure one or more account restrictions and silent protection that may be triggered by the panic PIN. For example, inputting the panic PIN may cause a user interface for the client application to display false account balance information, which may be lower than a true account balance, introduce low transfer limits, prohibit transfers, or any combination thereof, to prevent or mitigate unauthorized access to the user's assets while supporting user safety under duress. In some cases, after a threshold duration has passed since a panic PIN was input, assets of the user may be transferred to one or more beneficiaries that may be configured by the user. In some cases, the user may configure one or more other methods for accessing the user account (e . . . g, instead of or in addition to a PIN), such as biometric passkeys (e.g., fingerprints, facial recognition), gestures (e . . . g, infrared-detected gestures, detected movements, camera-detected gestures), multi-factor authentication, or the like. The user may configure a panic method for accessing the user account and a normal method for accessing the user account.

Particular aspects of the subject matter described in this disclosure can be implemented to realize one or more of the following potential advantages. In some examples, by introducing a panic PIN feature within a client application, users may silently activate safety protocols during emergencies, enhancing personal security without alerting potential attackers. This silent activation may provide a discreet method for users to signal distress, reducing the risk of escalation in dangerous situations. Additionally, or alternatively, the panic PIN may trigger automatic notification of law enforcement or designated security entities, facilitating rapid response and potentially deterring physical threats. Additionally, or alternatively, the panic PIN may enable account restrictions, such as blocking outgoing transactions or imposing transfer limits, which may protect user assets from unauthorized access. These restrictions may prevent financial loss by limiting the ability of attackers to access or transfer funds. Additionally, or alternatively, the panic PIN may allow users to configure deceptive account balances, which may mislead attackers and prevent further coercion. This deception may reduce the incentive for attackers to continue their efforts, potentially averting further harm. Additionally, or alternatively, the panic PIN may support the designation of beneficiaries, ensuring asset transfer to trusted parties if the user is unable to deactivate the safety protocols within a specified timeframe. Additionally, or alternatively, enabling other methods of accessing the user account, aside from or in addition to a PIN, may improve security and reduce the effect of user habits related to setting PINs.

FIG. 1 illustrates an example of a computing environment 100 that supports a panic PIN in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols may have layer two and layer two functionality, and each layer may support or utilize different tokens. Layer one may refer to the underlying main blockchain architecture, and layer one solutions are improvements directly integrated into the codebase of a cryptocurrency's main blockchain. Layer one solutions, on the other hand, are built on top of layer one and may interact with the main blockchain but have their own architecture. Layer two solutions may support offload of processing from the main blockchain (layer one) to improve scalability and speed while retaining the robust security of the main chain. Additionally, smart contracts implemented on the blockchain networks may support different types of tokens, and the code of the smart contracts may control how tokens are spent, who can spend the tokens, and other conditions for transfer. Additionally, one or more smart contracts may support a decentralized application ("Dapp") that facilitate various types of functionality. Accordingly, various types of tokens may be supported by a blockchain network.

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

The computing environment 100 may support a panic PIN for accessing a user account within a client application associated with a custodial platform entity (e.g., a cryptocurrency platform, custodial token platform 110). For example, a user may configure a panic PIN and a normal PIN, both of which may allow access to a user account. The normal PIN may be used for everyday use, and may allow access to the user account without extra safety protocols. However, if the user inputs a panic PIN, one or more safety protocols may be triggered. The panic PIN may allow access to the user account or a modified user account to avoid alerting an attacker of the triggered safety protocols. Introducing a panic PIN feature within a client application may allow users to silently activate safety protocols during emergencies, enhancing personal security without alerting potential attackers.

For example, the user may input the panic PIN. The client application, or the custodial platform entity via the client application, may identify the panic PIN and may send a notification that the panic PIN was input to one or more external security entities (e.g., law enforcement, private security), as well as an indication of the location of the user.

The panic PIN triggering automatic notification of law enforcement or designated security entities may facilitate rapid response and potentially deter physical threats. In some cases, the user may configure one or more account restrictions and silent protection that may be triggered by the panic PIN. For example, inputting the panic PIN may cause a user interface for the client application to display false account balance information, which may be lower than a true account balance, introduce low transfer limits, prohibit transfers, or any combination thereof, to prevent or mitigate unauthorized access to the user's assets while supporting user safety under duress. The account restrictions may prevent financial loss by limiting the ability of attackers to access or transfer funds, protecting user assets from unauthorized access. Additionally, or alternatively, inputting the panic PIN may lift one or more account restrictions to support user safety under duress by reducing a likelihood of retaliation or physical harm from an attacker due to restricted account access. In some cases, after a threshold duration has passed since a panic PIN was input, assets of the user may be transferred to one or more beneficiaries that may be configured by the user. Supporting the designation of beneficiaries may support asset transfer to trusted parties if the user is unable to deactivate the safety protocols within a specified timeframe.

Figure 2:
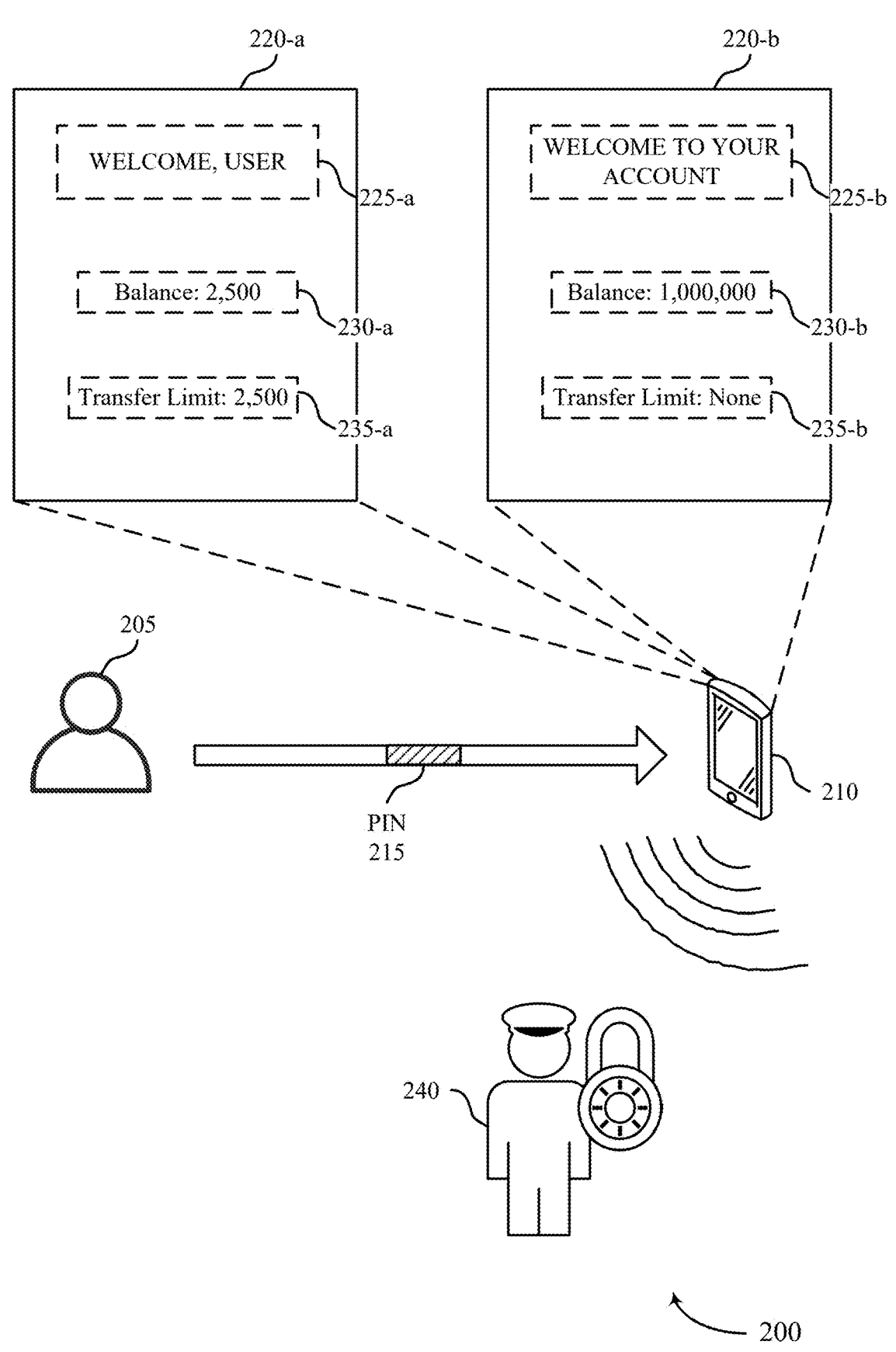
FIG. 2 shows an example of a signaling environment that supports a panic PIN in accordance with aspects of the present disclosure.

FIG. 2 shows an example of a signaling environment 200 that supports a panic PIN in accordance with aspects of the present disclosure. The signaling environment 200 may implement or be implemented to realize aspects of the computing environment 100. Signaling environment 200 may support user input including a panic PIN to trigger one or more safety protocols associated with a user account.

Cryptocurrency theft may occur in virtual environments or in physical environments. To prevent virtual attacks or scams, security systems and safeguards may be in place to prevent thefts and scams, warn users of potential scams, or the like. However, in some cases, users 205 may be targeted in physical environments to transfer cryptocurrency to attackers. For example, users 205 (e.g., account holders, customers) may be vulnerable to coercion, robbery, abduction, physical harm, or any combination thereof. Security tools, such as application locks and biometric account locks, may be limited in protecting users 205 in these situations, particularly physical confrontations. In some examples, the more capital (e.g., cryptocurrency) that an individual controls or holds, the greater a target they may become.

A cryptocurrency platform, supported by an application (e.g., client application) on a user device 210, may support one or more security measures to protect users 205, capital (e.g., cryptocurrency) for the users 205, or any combination thereof. For example, the application may perform one or more silent actions to support the user 205 without alerting a potential attacker. In some cases, a user account may be accessed using a PIN 215. In some cases, the PIN 215 may be a regular PIN and may grant the user 205 access to the user account as normal. In other cases, the PIN 215 may be a panic PIN, which may trigger one or more actions by the application, the user device 210, the cryptocurrency platform, or any combination thereof to protect the user 205 (e.g., one or more safety protocols). For example, the panic PIN may unlock the application and grant the user 205 access to the user account or to a modified user account, to avoid alerting an attacker that the panic PIN has been input, and may also silently trigger one or more designated actions on behalf of the user 205. In some examples, once a panic PIN has been triggered, one or more options to view or modify the panic PIN may be turned off to prevent an attacker from checking whether a panic PIN is enabled, activated, triggered, or the like.

In some cases, the user 205 may configure one or more other methods for accessing the user account (e.g., instead of or in addition to a PIN 215), such as passwords, biometric passkeys (e.g., fingerprints, facial recognition), gestures (e . . . g, infrared-detected gestures, detected movements, camera-detected gestures), multi-factor authentication, or any combination thereof. The user 205 may configure a panic method for accessing the user account (or a modified user account) and a normal method for accessing the user account. For example, the user 205 may configure a first fingerprint for normal access and a second fingerprint to enable the one or more safety protocols (e.g., a panic fingerprint), a first gesture for normal access and a second gesture to enable the one or more safety protocols, or any combination thereof. Additionally, or alternatively, the user 205 may configure a first access method for normal access and a second access method to enable the one or more safety protocols. For example, the user 205 may configure fingerprint access for normal access and a PIN 215 for panic access. In some examples, utilizing non-PIN access methods, different access methods, more complex access methods, or any combination thereof, may improve account security and reduce the risks of poor authentication habits associated with PINs 215 by the user 205, such as reusing PINs 215 across multiple platforms. While a PIN 215 is described herein for exemplary purposes, different methods of account access may be implemented instead, and the aspects described with reference to the PIN 215 may also apply to the other methods of account access.

In some cases, users 205 may be able to disarm the panic PIN after input. The application may support a disarming mechanism that may be designed to disarm when an original PIN, or a non-panic PIN, is input. For example, a user may input a PIN 215 into an application on the user device 210. The application may identify the PIN as a panic PIN and may initiate one or more safety protocols. The user 205 may then input a second PIN, which may be a normal PIN or a non-panic PIN. This may disarm, disable, or stop the one or more safety protocols. In some cases, the application may disable one or more messages, which may be displayed via a user interface 220 on the user device 210, after receiving the panic PIN, the normal PIN, or both. For example, the user interface 220 may display a message 225 (e.g., a non-descript message, secret message, a message set by the user 205) after receiving the PIN 215. The message 225 may be different depending on whether the PIN 215 is the panic PIN or the normal PIN. In some cases, the message 225 may be secret or coded to avoid alerting an attacker that a panic PIN has been input. The user interface 220 may also display a message 225 when the normal PIN is input to disarm the panic PIN. In some examples, the user 205 may configure the messages 225. For example, when the user 205 inputs a panic PIN, the application may display, via the user device 210, the user interface 220-a, which may include a message 225-a. When the user 205 inputs a normal PIN, the application may display the user interface 220-b, which may include a message 225-b that may be different from the message 225-a.

In some examples, after inputting the panic PIN, a user interface to disarm the panic PIN may be available. The user interface may include a user input field for the normal PIN. In some cases, the one or more safety protocols may disarm when the normal PIN is input. In some examples, the user interface may refrain from displaying a message of confirmation. In some cases, the user 205 may contact an entity associated with the application to disarm the panic PIN. For example, the user 205 may call a representative of the cryptocurrency platform to disarm the panic PIN mechanism. In some cases, the user account may include false balance information 230-*a* (e.g., fake or abnormally small balance) with no malicious transaction history as an indicator that the panic PIN may be enabled, and the user 205 may disable it accordingly. In some cases, after the panic PIN is input for a threshold duration, the account balance for the user 205 may be automatically transferred to a duplicate account associated with the cryptocurrency platform, to a designated beneficiary account, or both. In some examples, the automatic transfer may be reversed by the user 205 at a later period.

The one or more safety protocols that may be triggered by the panic PIN may be configured by the user 205. In some cases, the application may trigger a notification to be sent to a secure entity 240, such as law enforcement, private security, or a trusted entity, that indicates that the panic PIN may have been input by the user 205. The application may also share a location of the user 205 with the secure entity 240. In some cases, the application may also trigger a notification, location sharing, or both to one or more emergency contacts, beneficiaries, or other configured entities. The notification and location of the user 205 may be broadcast via one or more emergency communication protocols for the user device 210, one or more messages triggered by the application, one or more messages triggered by the cryptocurrency platform, or any combination thereof. The message, or messages, including the notification and location of the user 205 may be a message sent from the user device 210, such as by triggering an emergency calling feature of the user device 210. Additionally, or alternatively, the message may be sent via the user device 210 based on a request from the application. Additionally, or alternatively, the message may be a beacon sent from the user device 210, another device associated with the cryptocurrency platform, another device associated with the application, or any combination thereof.

In some examples, the message, or one or more messages, sent to the one or more external entities 240 may be configurable by the user 205. For example, the user 205 may input content for a first message to be sent to a law enforcement entity, and content for a second message to be sent to a private security entity. In some examples, the notification may be sent to the secure entity 240 based on one or more law enforcement partnerships, which may include global law enforcement partnerships. In some examples, the location of the user 205 may be based on a location of the user device 210, which may, for example, be shared with the client application during activation of the panic PIN feature. The location sharing may utilize geographic positioning system (GPS) information, network triangulation, or any combination thereof to support location tracking for the user device 210 in order to provide precise location data. The location may be shared and updated in real-time, or on a frequent basis, to support the quick and accurate response of security entities 240.

In some cases, the one or more safety protocols may include one or more account restrictions for the user account. For example, the user 205 may configure a threshold amount of assets that may be transferred after inputting the panic PIN, a threshold amount of assets that may be displayed for the user account after inputting the panic PIN, one or more account protections that may be enabled or deactivated after inputting the panic PIN, or any combination thereof. For example, a user 205 may configure the user account to temporarily remove account protections if a panic PIN is input to avoid confrontation or threats of physical violence. The user 205 may prefer to give up assets under duress, and may configure the user account to support this choice.

Additionally, or alternatively, a user 205 may configure the user account to be more difficult to access and drain when the panic PIN is input. For example, the user 205 may configure a threshold amount of assets that may be transferrable after a panic PIN is input, which may limit the amount of funds that an attacker may be able to force the user 205 to transfer (e.g., a transfer limit 235). For example, if the user 205 inputs a panic PIN, the transfer limit 235-*a* may be introduced, which may be smaller than a transfer limit 235-*b* when a normal PIN is input. The user interface may display an indication of the transfer limit 235, a user interface activated when the user 205 or another user attempts to transfer funds may display an indication of the transfer limit 235, a pop-up message may display an indication of the transfer limit 235, or any combination thereof. In some examples, the threshold amount of assets may be zero, and the assets may be non-transferrable after the panic PIN is input. In some examples, the one or more safety protocols may include blocking outgoing transactions, imposing strict limits (e.g., small thresholds) on user account activities, allowing pre-configured, small balances to be transferred, or any combination thereof. In some cases, the user 205 may enable automatic activation of one or more account restrictions after inputting the panic PIN. In some examples, the user 205 may configure a threshold amount of assets that may be transferred with limited or no account protections (e.g., easily, without friction), while any amount above the threshold amount may require bypassing or adhering to one or more account protections.

In some cases, the user 205 may configure false balance information 230-*a* for the user account to display via the user interface 220. For example, the user 205 may configure one or more amounts of assets for the user account that may be displayed via the user interface 220 when the panic PIN is input. The one or more amounts of assets may be less than one or more actual amounts of assets possessed in the user account. The user 205 may configure the user interface 220 to deceive attackers by hiding true balance information 230-*b* and displaying pre-configured, smaller balances. In some examples, the user account may also be restricted to transferring the pre-configured, smaller balances (e.g., transfer limit 235-*a*).

In some cases, the user 205 may designate one or more beneficiaries for the user account. After a threshold duration without disarming a panic PIN, assets may be transferred to one or more designated beneficiary accounts. The user 205 may configure the threshold duration (e.g., a quantity of days), the amount of assets that may be transferred or whether a full balance transfer may occur, the beneficiary accounts, or any combination thereof.

The user 205 may be provided with the configurable options for the one or more safety protocols when enabling a panic PIN feature. For example, a user 205 may indicate to enable a panic PIN feature at the user account via the application on the user device 210. The user may configure at least two PINs for account access: a normal PIN and a panic PIN. In some examples, the user 205 may configure multiple PINs that may be associated with multiple configurations. For example, a first PIN may be a normal PIN for account access, a second PIN may be a panic PIN that locks down the user account, and a third PIN may be a panic PIN that restricts transfers from the user account and institutes deceptive account balances (e.g., false balance information 230-*a*). The application may automatically adjust one or more features in order to enable the panic PIN feature. For example, the application may enable location tracking for the user device 210, or may prompt the user 205 to enable location sharing. Additionally, or alternatively, the application may disable biometric account access based on enabling the panic PIN feature, such that the user account may not be accessible with biometric identification (e.g., fingerprint, facial recognition). In some examples, disabling biometric identification may prevent forced account access using biometric identification under duress or physical force. Additionally, or alternatively, the user 205 may configure an access method different from a PIN 215 (e.g., biometric access, gesture access, password). In some examples, the application may disable one or more access methods, such as PIN access, which may support implementation of a panic feature using other account access methods that may, in some cases, be more secure. In some cases, the user 205 may be provided with a menu of options to configure for the one or more safety protocols (e.g., via a user interface), such as designated beneficiaries, configurable account restrictions, configurable deceptive account information (e.g., false balance information 230-*a*, false transfer limits 235-*a*), private security notifications and location sharing, configurable messages 225, or any combination thereof.

In some cases, to avoid mistakenly inputting a panic PIN, the application may accept configuration of a panic PIN if the panic PIN meets a threshold of difference from a normal PIN (e.g., a quantity of numbers that may be different between PINs). For example, a normal PIN may be 1234. A panic PIN of 1235 or 1324 may not be accepted, as there may be an increased risk of false positives or mistakenly inputting a panic PIN. However, 9876 or 1437, for example, may be accepted.

The panic PIN enabled features may curb violent attacks, empower users 205 with defensive options for attacks, and act as a deterrent against physical attacks. The configurability of the safety protocols may improve security measures, particularly static security measures, to enable personalized and adaptive threat responses. Additionally, or alternatively, the custodial platform entity may support multiple users 205 with the panic PIN feature enabled, supporting a scalable solution to physical security risks that may be deployed widely and reliably, or among particular key users 205.

Figure 3:
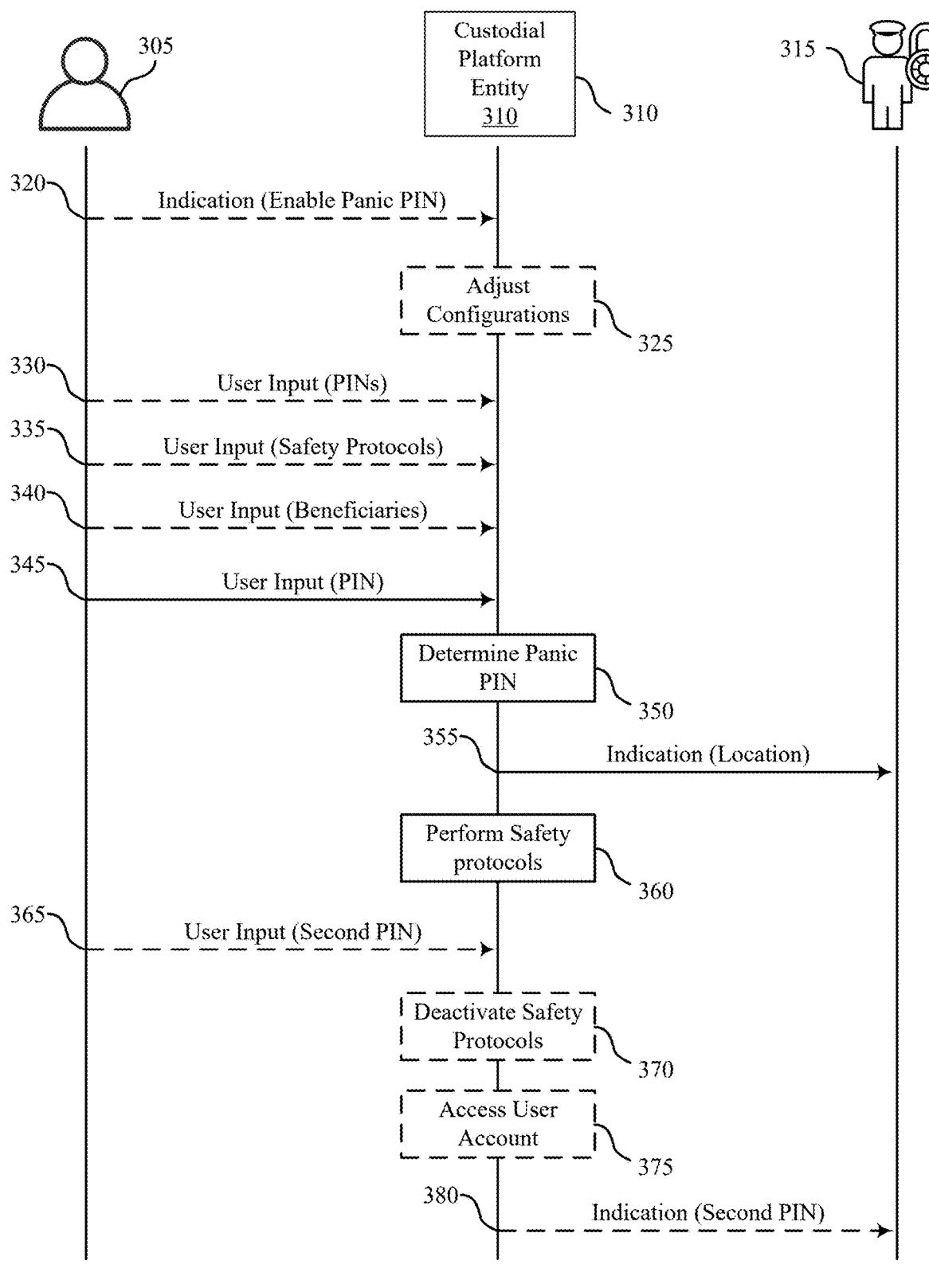
FIG. 3 shows an example of a process flow that supports a panic PIN in accordance with aspects of the present disclosure.

FIG. 3 shows an example of a process flow 300 that supports a panic PIN in accordance with aspects of the present disclosure. The process flow 300 may implement or be implemented to realize aspects of the computing environment 100 and the signaling environment 200. Process flow 300 may support enablement of a panic PIN feature for accessing a user account to support one or more safety protocols.

In some implementations, at 320, a custodial platform entity 310 may receive, via a client application on a user device and based on a user input (e.g., from the user 305 via a client application on a user device, second user input), an indication (e.g., second indication) that the user 305 has enabled a security feature that supports the panic PIN.

In some implementations, at 325, the custodial platform entity 310 may adjust one or more configurations for the user account based on receiving the indication that the user has enabled the security feature at 320, where adjusting the one or more configurations may include one or more of disabling biometric access to the user account, enabling a location tracking mechanism for the user 305 (e.g., via the user device), or any combination thereof.

In some implementations, at 330, the custodial platform entity 310 may receive, via the client application, one or more user inputs (e.g., third user inputs) including a first PIN and a second PIN, where the client application may determine that the first PIN includes a panic PIN at 350 based on receiving the one or more user inputs at 330.

In some implementations, at 335, the custodial platform entity 310 may receive, via the client application, one or more user inputs (e.g., second user inputs from the user 305) that may indicate one or more safety protocols of a plurality of safety protocols, where transmitting an indication that notifies an external entity of a location of the user 305 at 355 may be based on the one or more user inputs at 335. For example, the user 305 may configure one or more safety protocols for a panic PIN feature.

In some implementations, at 340, the custodial platform entity 310 may receive, prior to receiving a user input at 345 (e.g., and via the client application), one or more second user inputs indicating one or more designated beneficiaries, the one or more designated beneficiaries including one or more blockchain wallet addresses.

At 345, the custodial platform entity 310 may receive, via a client application on a user device (e.g., user device 210), a user input (e.g., from a user 305) including a first PIN (e.g., PIN 215), where the first PIN and a second PIN may be respectively used to access a user account associated with the client application that supports at least one blockchain wallet. The client application may be associated with the custodial platform entity 310 (e.g., cryptocurrency platform).

At 350, the custodial platform entity 310 may determine that the first PIN may include a panic PIN, where the panic PIN may be associated with activation of one or more safety protocols associated with the user 305 of the client application and associated with at least one blockchain wallet address associated with the at least one blockchain wallet. The second PIN may not include the panic PIN (e.g., the second PIN may be different from the first PIN, may not be a panic PIN, may be a normal PIN).

At 355, the custodial platform entity 310 may transmit, based on the determination and in accordance with the one or more safety protocols, an indication that notifies an external entity 315 (e.g., a secure entity 240) of a location of the user device (e.g., for the user 305). The external entity 315 may be different from the custodial platform entity 310. In some cases, the external entity 315 may include a law enforcement security entity, a private security entity, or any combination thereof. In some cases, the custodial platform entity 310 may transmit the indication to the user device that hosts the client application, where the indication may trigger a safety feature at the user device, the safety feature corresponding to notifying the external entity 315. In some cases, the custodial platform entity 310 may broadcast one or more beacons to the external entity 315, or may trigger broadcasting of the one or more beacons from the user device.

At 360, the custodial platform entity 310 may perform one or more further actions based on the determination and in accordance with the one or more safety protocols. For example, in some cases, the custodial platform entity 310 may enable, based on determining that the first PIN may include the panic PIN at 350, one or more account restrictions for the user account in accordance with the one or more safety protocols, where the one or more account restrictions may include one or more threshold quantities of transferrable assets. Additionally, or alternatively, the custodial platform entity 310 may restrict, based on determining that the first PIN may include the panic PIN at 350, transfer of assets associated with the user account from the at least one blockchain wallet address to at least a second blockchain wallet address. Additionally, or alternatively, the custodial platform entity 310 may transmit, to the client application, an indication to display, via a user interface (e.g., user interface 220), a message indicating that the first PIN may include the panic PIN. In some examples, the message may include a secret message including one or more code words that may indicate that the first PIN may include the panic PIN.

Additionally, or alternatively, the custodial platform entity 310 may transmit, to the client application and based on transmitting the indication at 355, a second indication that may confirm transmission of the indication that notifies the external entity 315. For example, the custodial platform entity 310 may confirm successful transmission of the indication to the client application, the user 305, or both. Additionally, or alternatively, the custodial platform entity 310 may display, via a user interface of the client application, a false account balance for the user account, the false account balance including a configurable amount of one or more crypto tokens associated with the at least one blockchain wallet according to the one or more safety protocols. Additionally, or alternatively, the custodial platform entity 310 may broadcast, after receiving the user input at 345, one or more message that may transfer one or more assets associated with the user account to the one or more blockchain wallet addresses (e.g., of the designated beneficiaries, as described further at 340) based on a duration after receiving the user input at 345 satisfying a threshold duration. For example, after a threshold period of time, the custodial platform entity 310 may initiate a transfer of the assets from the user account to the designated beneficiaries.

In some implementations, at 365, the custodial platform entity 310 may receive, after receiving the user input (e.g., and via the client application), a second user input including the second PIN, where the second PIN may be used to access the user account without the one or more safety protocols (e.g., the normal PIN). At 370, the custodial platform entity 310 may deactivate, based on receiving the second PIN, the one or more safety protocols. At 375, the custodial platform entity 310 may access, based on deactivating the one or more safety protocols, information associated with the account. For example, the custodial platform entity 310 may allow the user 305, via the client application, to access the user account. In some implementations, at 380, the custodial platform entity 310 may transmit, based on receiving the second user input at 365, an indication (e.g., second indication) that may notify the external entity 315 that the second user input may include the second PIN. For example, the custodial platform entity 310 may transmit a notification to the external entity 315 to disarm the panic PIN notification (e.g., false alarm).

Figure 4:
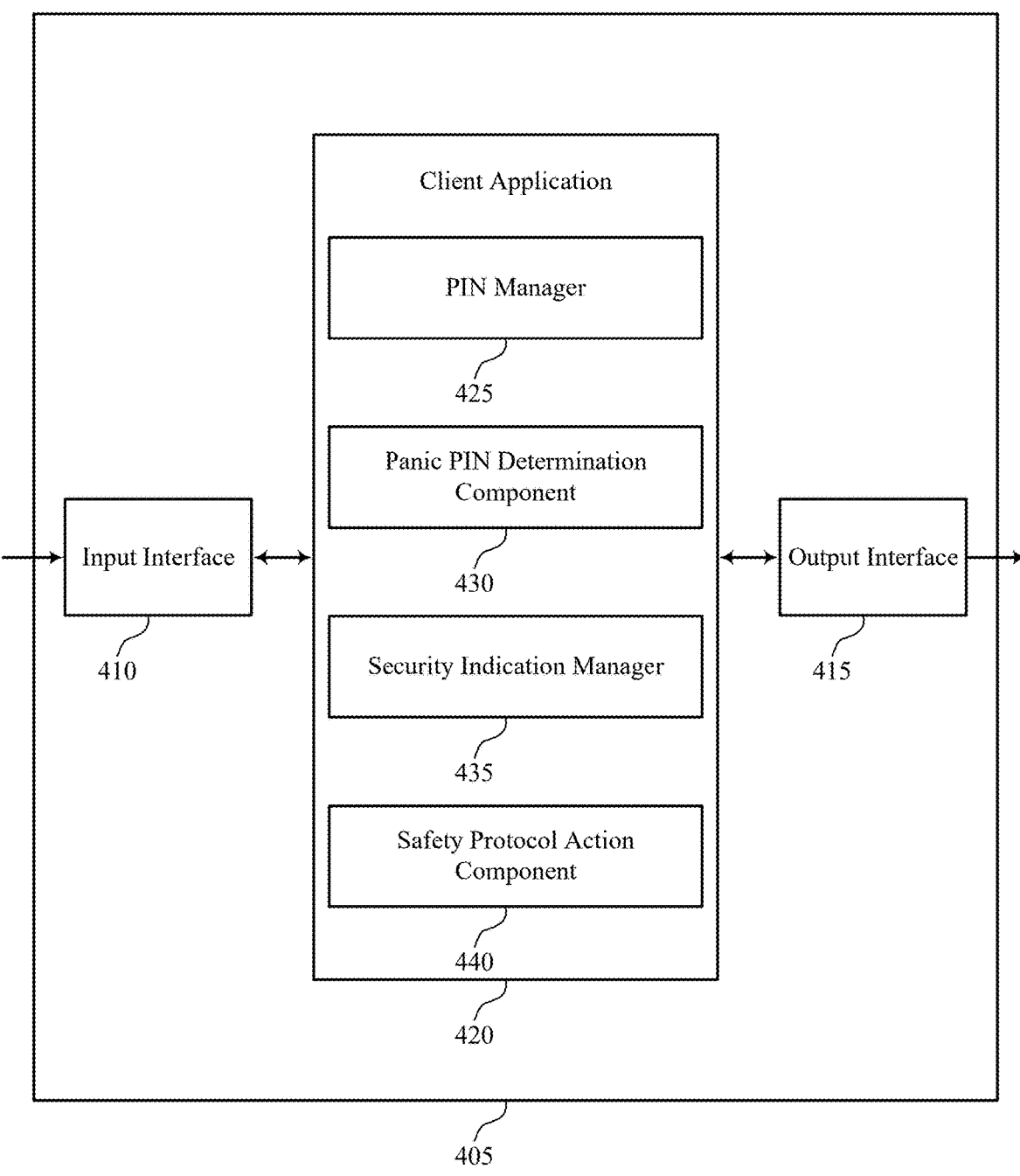
FIG. 4 shows a block diagram of an apparatus that supports a panic PIN in accordance with aspects of the present disclosure.

FIG. 4 shows a block diagram 400 of a device 405 that supports a panic PIN in accordance with aspects of the present disclosure. The device 405 may include an input interface 410, an output interface 415, and a client application 420. The device 405, or one or more components of the device 405 (e.g., the input interface 410, the output interface 415, the client application 420), may include at least one processor, which may be coupled with at least one memory, to support the described techniques. Each of these components may be in communication with one another (e.g., via one or more buses).

The input interface 410 may manage input signaling for the user device 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the user device 405 for processing. For example, the input interface 410 may transmit such corresponding signaling to the client application 420 to support a panic PIN. In some cases, the input interface 410 may be a component of a 610 as described with reference to FIG. 6.

The output interface 415 may manage output signaling for the device 405. For example, the output interface 415 may receive signaling from other components of the device 405, such as the client application 420, and may transmit such output signaling corresponding to (e.g., representative of or otherwise based on) such signaling to other systems or devices. In some cases, the output interface 415 may be a component of a communication interface 610 as described with reference to FIG. 6.

For example, the client application 420 may include a PIN manager 425, a panic PIN determination component 430, a security indication manager 435, a safety protocol action component 440, or any combination thereof. In some cases, the client application may be associated with a custodial platform entity, which may control the operations at the client application 420, including the PIN manager 425, the panic PIN determination component 430, the security indication manager 435, the safety protocol action component 440, or any combination thereof. In some examples, the client application 420, or various components thereof, may be configured to perform various operations (e.g., receiving, monitoring, transmitting) using or otherwise in cooperation with the input interface 410, the output interface 415, or both. For example, the client application 420 may receive information from the input interface 410, send information to the output interface 415, or be integrated in combination with the input interface 410, the output interface 415, or both to receive information, transmit information, or perform various other operations as described herein.

The PIN manager 425 may be configured as or otherwise support a means for receiving, via the client application 420 on a user device (e.g., device 405), a user input comprising a first PIN, wherein the first PIN and a second PIN are respectively used to access a user account associated with the client application that supports at least one blockchain wallet, and wherein the client application 420 is associated with a custodial platform entity. The panic PIN determination component 430 may be configured as or otherwise support a means for determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The security indication manager 435 may be configured as or otherwise support a means for transmitting, based at least in part on the determination and in accordance with the one or more safety protocols, an indication that notifies an external entity of a location of the user device, wherein the external entity is different from the custodial platform entity. The safety protocol action component 440 may be configured as or otherwise support a means for performing one or more further actions based at least in part on the determination and in accordance with the one or more safety protocols.

Figure 5:
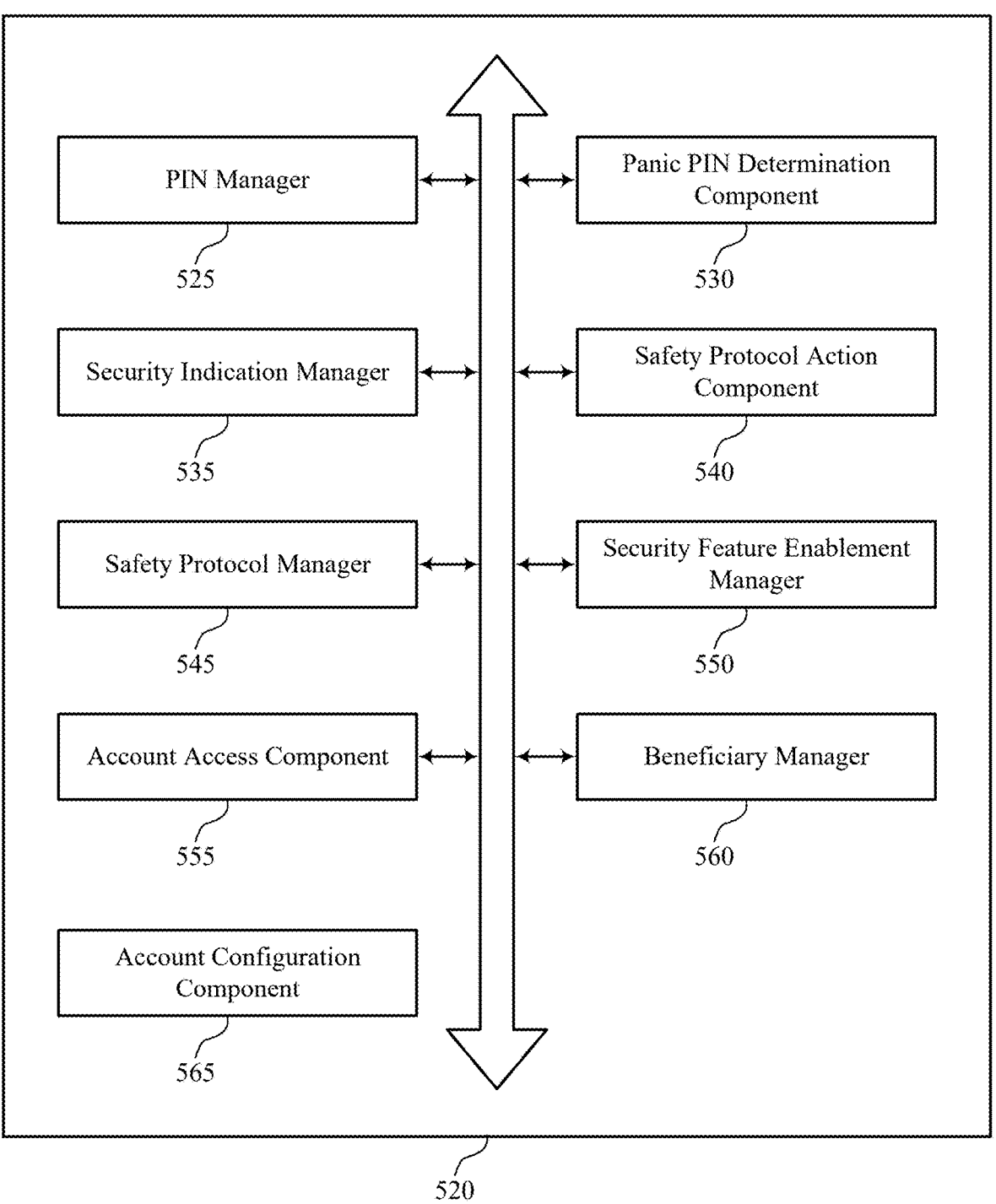
FIG. 5 shows a block diagram of a client application that supports a panic PIN in accordance with aspects of the present disclosure.

FIG. 5 shows a block diagram 500 of a client application 520 that supports a panic PIN in accordance with aspects of the present disclosure. The client application 520 may be an example of aspects of a client application or a client application 420, or both, as described herein. The client application 520, or various components thereof, may be an example of means for performing (e.g., to cause the client application 520 to perform) various aspects of a panic PIN as described herein. For example, the client application 520 may include a PIN manager 525, a panic PIN determination component 530, a security indication manager 535, a safety protocol action component 540, a safety protocol manager 545, a security feature enablement manager 550, an account access component 555, a beneficiary manager 560, an account configuration component 565, or any combination thereof. In some cases, the client application may be associated with a custodial platform entity, which may control the operations at the client application 420, including the PIN manager 525, the panic PIN determination component 530, the security indication manager 535, the safety protocol action component 540, the safety protocol manager 545, the security feature enablement manager 550, the account access component 555, the beneficiary manager 560, the account configuration component 565, or any combination thereof. Each of these components, or components of subcomponents thereof (e.g., one or more processors, one or more memories), may communicate, directly or indirectly, with one another (e.g., via one or more buses).

The PIN manager 525 may be configured as or otherwise support a means for receiving, via a client application on a user device, a user input comprising a first PIN, wherein the first PIN and a second PIN are respectively used to access a user account associated with the client application that supports at least one blockchain wallet, and wherein the client application is associated with a custodial platform entity. The panic PIN determination component 530 may be configured as or otherwise support a means for determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The security indication manager 535 may be configured as or otherwise support a means for transmitting, based at least in part on the determination and in accordance with the one or more safety protocols, an indication that notifies an external entity of a location of the user device, wherein the external entity is different from the custodial platform entity. The safety protocol action component 540 may be configured as or otherwise support a means for performing one or more further actions based at least in part on the determination and in accordance with the one or more safety protocols.

In some examples, the safety protocol manager 545 may be configured as or otherwise support a means for receiving, via the client application, one or more second user inputs that indicate the one or more safety protocols of a plurality of safety protocols, wherein transmitting the indication is based at least in part on the one or more second user inputs.

In some examples, the security feature enablement manager 550 may be configured as or otherwise support a means for receiving, via the client application and based at least in part on a second user input, a second indication that a user has enabled a security feature that supports the panic PIN. In some examples, the PIN manager 525 may be configured as or otherwise support a means for receiving, via the client application, one or more third user inputs corresponding to setting the panic PIN, wherein determining that the first PIN comprises the panic PIN is based at least in part on receiving the one or more third user inputs.

In some examples, the account configuration component 565 may be configured as or otherwise support a means for adjusting one or more configurations for the user account based at least in part on receiving the indication that the user has enabled the security feature, wherein adjusting the one or more configurations comprises one or more of disabling biometric access to the user account, enabling a location tracking mechanism for the user, or any combination thereof.

In some examples, to support performing the one or more further actions, the safety protocol action component 540 may be configured as or otherwise support a means for enabling, based at least in part on determining that the first PIN comprises the panic PIN, one or more account restrictions for the user account in accordance with the one or more safety protocols, wherein the one or more account restrictions include one or more threshold quantities of transferrable assets.

In some examples, to support performing the one or more further actions, the safety protocol action component 540 may be configured as or otherwise support a means for restricting, based at in part on determining that the first PIN comprises the panic PIN, transfer of assets associated with the user account from the at least one blockchain wallet address to at least a second blockchain wallet address.

In some examples, to support transmitting the indication, the security indication manager 535 may be configured as or otherwise support a means for transmitting the indication to the user device that hosts the client application, wherein the indication triggers a safety feature at the user device, the safety feature corresponding to notifying the external entity.

In some examples, to support transmitting the indication, the security indication manager 535 may be configured as or otherwise support a means for broadcasting one or more beacons to the external entity.

In some examples, the external entity comprises a law enforcement security entity, a private security entity, or any combination thereof.

In some examples, to support performing the one or more further actions, the safety protocol action component 540 may be configured as or otherwise support a means for transmitting, to the client application, an indication to display, via a user interface, a message indicating that the first PIN comprises the panic PIN.

In some examples, the message comprises a secret message including one or more code words that indicate that the first PIN comprises the panic PIN.

In some examples, to support performing the one or more further actions, the safety protocol action component 540 may be configured as or otherwise support a means for transmitting, to the client application and based at least in part on transmitting the indication, a second indication that confirms transmission of the indication that notifies the external entity.

In some examples, the PIN manager 525 may be configured as or otherwise support a means for receiving, after receiving the user input, a second user input comprising the second PIN, the second PIN used to access the user account without the one or more safety protocols. In some examples, the safety protocol manager 545 may be configured as or otherwise support a means for deactivating, based at least in part on receiving the second PIN, the one or more safety protocols. In some examples, the account access component 555 may be configured as or otherwise support a means for accessing, based at least in part on deactivating the one or more safety protocols, information associated with the user account.

In some examples, the security indication manager 535 may be configured as or otherwise support a means for transmitting, based at least in part on receiving the second user input, a second indication that notifies the external entity that the second user input comprises the second PIN.

In some examples, to support performing the one or more further actions, the safety protocol action component 540 may be configured as or otherwise support a means for displaying, via a user interface of the client application, a false account balance for the user account, the false account balance comprising a configurable amount of one or more crypto tokens associated with the at least one blockchain wallet according to the one or more safety protocols.

In some examples, the beneficiary manager 560 may be configured as or otherwise support a means for receiving, prior to receiving the user input, one or more second user inputs indicating one or more designated beneficiaries, the one or more designated beneficiaries comprising one or more blockchain wallet addresses. In some examples, to perform the one or more further actions, the safety protocol action component 540 may be configured as or otherwise support a means for broadcasting, after receiving the user input, one or more messages that transfer one or more assets associated with the user account to the one or more blockchain wallet addresses based at least in part on a duration after receiving the user input satisfying a threshold duration.

Figure 6:
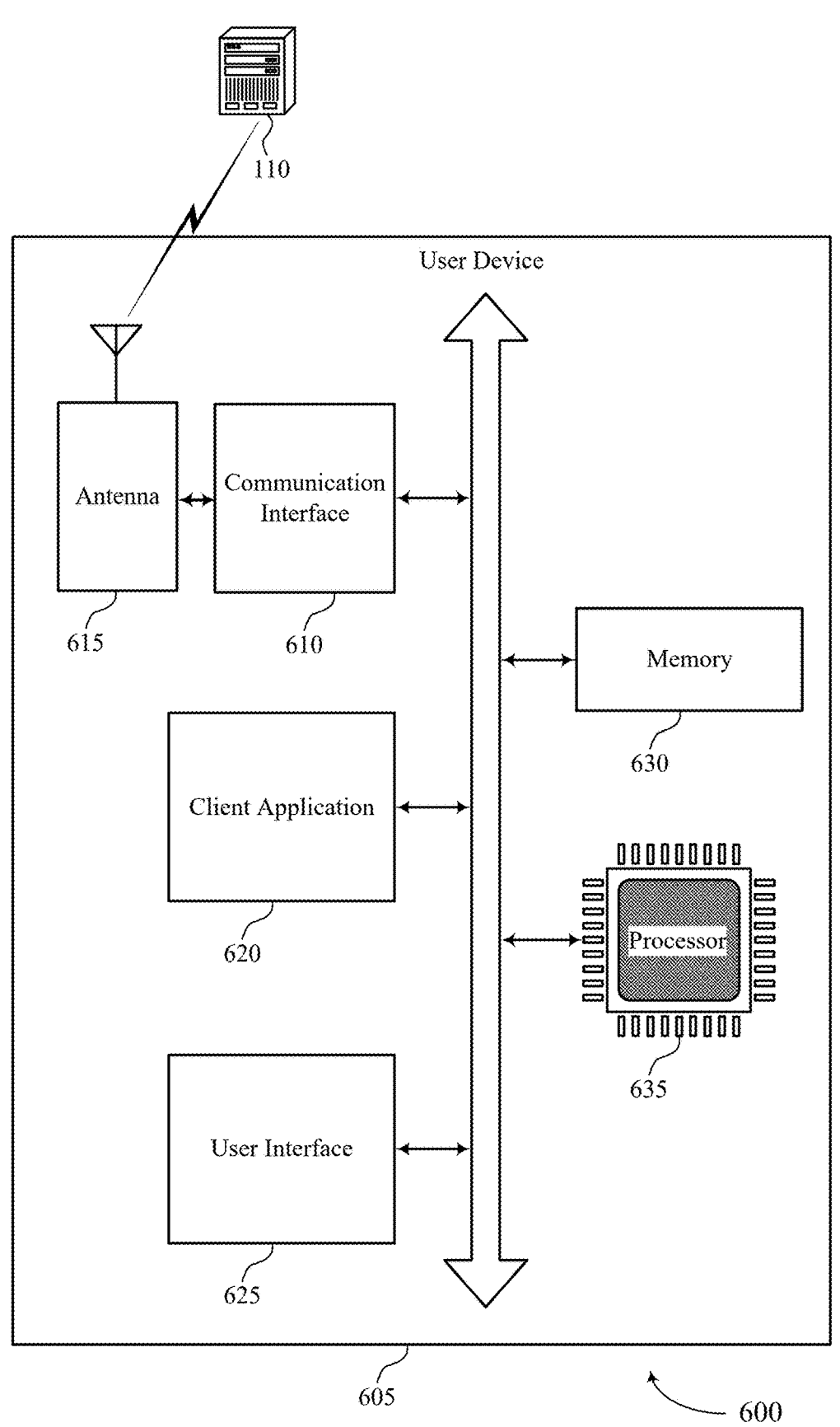
FIG. 6 shows a diagram of a system including a device that supports a panic PIN in accordance with aspects of the present disclosure.

FIG. 6 shows a diagram of a system 600 including a device 605 that supports a panic PIN in accordance with aspects of the present disclosure. The device 605 may be an example of or include components of a device 405 as described herein. The device 605 may include components for bi-directional voice and data communications including components for transmitting and receiving communications, such as a client application 620, a communication interface 610, one or more antennas 615, a user interface component 625, at least one memory 630, and at least one processor 635. Each of these components, or components of subcomponents thereof (e.g., one or more processors, one or more memories), may communicate, directly or indirectly, with one another (e.g., via one or more buses).

The communication interface 610 may manage input and output signals for the device 605 via the antenna 615. For example, the communication interface 610 may enable the user device 605 to exchange information (e.g., input information, output information, or both) with other systems or devices, such as custodial token platform 110 (e.g., supported by one or more servers), via one or more wired or wireless communication links. The communication interface 610 may also utilize or interact with antenna 615 to support communication with other systems or devices. In some cases, the communication interface 610 may represent a physical connection or port to an external peripheral, such as a hardware wallet device. In some cases, the communication interface 610 may utilize an operating system such as iOS®, ANDROID®, MS-DOS®, MS-WINDOWS®, OS/2®, UNIX®, LINUX®, or another known operating system. The communication interface 610 may be implemented as part of the processor 635.

In some cases, the device 605 may include a single antenna 615. However, in some other cases, the device 605 may have more than one antenna 615, which may be capable of concurrently transmitting or receiving multiple wireless transmissions. The communication interface 610 may communicate bi-directionally, via the one or more antennas 615, wired, or wireless links as described herein. For example, the communication interface 610 may represent a wireless transceiver and may communicate bi-directionally with another wireless transceiver. The communication interface 610 may also include a modem to modulate the packets, to provide the modulated packets to one or more antennas 615 for transmission, and to demodulate packets received from the one or more antennas 615.

The user interface component 625 may represent a keyboard, a mouse, a touchscreen, a microphone, or a similar device or component. In some cases, a user may interact with the user interface component 625. In other cases, the user interface component 625 may operate automatically without user interaction. The user interface component 625 may display or output information such as information received from other systems or devices or information to be transmitted to other systems or devices.

The memory 630 may include RAM and ROM. The memory 630 may store computer-readable, computer-executable software including instructions that, when executed, cause at least one processor 635 to perform various functions described herein. In some cases, the memory 630 may contain, among other things, a BIOS which may control basic hardware or software operation such as the interaction with peripheral components or devices. The memory 630 may be an example of a single memory or multiple memories. For example, the user device 605 may include one or more memories 630.

The processor 635 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 635 may be configured to operate a memory array using a memory controller. In other cases, a memory controller may be integrated into the processor 635. The processor 635 may be configured to execute computer-readable instructions stored in at least one memory 630 to perform various functions (e.g., functions or tasks supporting a method and system for a panic PIN). Though a single processor 635 is depicted in the example of FIG. 6, it is to be understood that the user device 605 may include any quantity of one or more of processors 635 and that a group of processors 635 may collectively perform one or more functions ascribed herein to a processor, such as the processor 635. The processor 635 may be an example of a single processor or multiple processors. For example, the device 605 may include one or more processors 635.

For example, the client application 620 may be configured as or otherwise support a means for receiving, via a client application on a user device, a user input comprising a first PIN, wherein the first PIN and a second PIN are respectively used to access a user account associated with the client application that supports at least one blockchain wallet, and wherein the client application is associated with a custodial platform entity. The client application 620 may be configured as or otherwise support a means for determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The client application 620 may be configured as or otherwise support a means for transmitting, based at least in part on the determination and in accordance with the one or more safety protocols, an indication that notifies an external entity of a location of the user device, wherein the external entity is different from the custodial platform entity. The client application 620 may be configured as or otherwise support a means for performing one or more further actions based at least in part on the determination and in accordance with the one or more safety protocols.

By including or configuring the client application 620 in accordance with examples as described herein, the device 605 may support techniques for improved user security and safety, improved security of cryptocurrency and user assets, and flexible configuration of safety protocols according to user need.

The client application 620 may include an application (e.g., "app"), program, software, extension, or other component which is configured to facilitate communications with a custodial token platform 110 on a server, one or more nodes of a blockchain network 105, other user devices 605, and other devices or systems. For example, the client application 620 may be an application executable on the user device 605, and the client application 620 may be configured to receive data from a custodial token platform 110, transmit data to the custodial token platform 110, process such data, and cause presentation of such data to a user via a user interface component 625. The client application 620 may be an example of a wallet application, a wallet device, or both, and may be associated with a wallet address and may access or use a private key to sign messages to facilitate transfer of crypto tokens, messages, transactions, or the like via a blockchain distributed data store.

FIG. 7 shows a flowchart illustrating a method 700 that supports a panic PIN in accordance with aspects of the present disclosure. The operations of the method 700 may be implemented by a user device or its components as described herein. For example, the operations of the method 700 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 705, the method may include receiving, via a client application on a user device, a user input comprising a first PIN, wherein the first PIN and a second PIN are respectively used to access a user account associated with the client application that supports at least one blockchain wallet, and wherein the client application is associated with a custodial platform entity. The operations of 705 may be performed in accordance with examples as disclosed herein. In some examples, aspects of the operations of 705 may be performed by a PIN manager 525.

At 710, the method may include determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The operations of 710 may be performed in accordance with examples as disclosed herein. In some examples, aspects of the operations of 710 may be performed by a panic PIN determination component 530.

At 715, the method may include transmitting, based at least in part on the determination and in accordance with the one or more safety protocols, an indication that notifies an external entity of a location of the user device, wherein the external entity is different from the custodial platform entity.

The operations of 715 may be performed in accordance with examples as disclosed herein. In some examples, aspects of the operations of 715 may be performed by a security indication manager 535.

At 720, the method may include performing one or more further actions based at least in part on the determination and in accordance with the one or more safety protocols. The operations of 720 may be performed in accordance with examples as disclosed herein. In some examples, aspects of the operations of 720 may be performed by a safety protocol action component 540.

FIG. 8 shows a flowchart illustrating a method 800 that supports a panic PIN in accordance with aspects of the present disclosure. The operations of the method 800 may be implemented by a user device or its components as described herein. For example, the operations of the method 800 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 805, the method may include receiving, via the client application, one or more second user inputs that indicate the one or more safety protocols of a plurality of safety protocols, wherein transmitting an indication is based at least in part on the one or more second user inputs. The operations of 805 may be performed in accordance with examples as disclosed herein. In some examples, aspects of the operations of 805 may be performed by a safety protocol manager 545.

At 810, the method may include receiving, via a client application on a user device, a user input comprising a first PIN, wherein the first PIN and a second PIN are respectively used to access a user account associated with the client application that supports at least one blockchain wallet, and wherein the client application is associated with a custodial platform entity. The operations of 810 may be performed in accordance with examples as disclosed herein. In some examples, aspects of the operations of 810 may be performed by a PIN manager 525.

At 815, the method may include determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The operations of 815 may be performed in accordance with examples as disclosed herein. In some examples, aspects of the operations of 815 may be performed by a panic PIN determination component 530.

At 820, the method may include transmitting, based at least in part on the determination and in accordance with the one or more safety protocols, the indication that notifies an external entity of a location of the user device, wherein the external entity is different from the custodial platform entity. The operations of 820 may be performed in accordance with examples as disclosed herein. In some examples, aspects of the operations of 820 may be performed by a security indication manager 535.

At 825, the method may include performing one or more further actions based at least in part on the determination and in accordance with the one or more safety protocols. The operations of 825 may be performed in accordance with examples as disclosed herein. In some examples, aspects of the operations of 825 may be performed by a safety protocol action component 540.

FIG. 9 shows a flowchart illustrating a method 900 that supports a panic PIN in accordance with aspects of the present disclosure. The operations of the method 900 may be implemented by a user device or its components as described herein. For example, the operations of the method 900 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 905, the method may include receiving, via a client application on a user device, a user input comprising a first PIN, wherein the first PIN and a second PIN are respectively used to access a user account associated with the client application that supports at least one blockchain wallet, and wherein the client application is associated with a custodial platform entity. The operations of 905 may be performed in accordance with examples as disclosed herein. In some examples, aspects of the operations of 905 may be performed by a PIN manager 525.

At 910, the method may include determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN. The operations of 910 may be performed in accordance with examples as disclosed herein. In some examples, aspects of the operations of 910 may be performed by a panic PIN determination component 530.

At 915, the method may include enabling, based at least in part on determining that the first PIN comprises the panic PIN, one or more account restrictions for the user account in accordance with the one or more safety protocols, wherein the one or more account restrictions include one or more threshold quantities of transferrable assets. The operations of 915 may be performed in accordance with examples as disclosed herein. In some examples, aspects of the operations of 915 may be performed by a safety protocol action component 540.

At 920, the method may include transmitting, based at least in part on the determination and in accordance with the one or more safety protocols, an indication that notifies an external entity of a location of the user device, wherein the external entity is different from the custodial platform entity. The operations of 920 may be performed in accordance with examples as disclosed herein. In some examples, aspects of the operations of 920 may be performed by a security indication manager 535.

At 925, the method may include performing one or more further actions based at least in part on the determination and in accordance with the one or more safety protocols. The operations of 925 may be performed in accordance with examples as disclosed herein. In some examples, aspects of the operations of 925 may be performed by a safety protocol action component 540.

A method by an apparatus is described. The method may include receiving, via a client application on a user device, a user input comprising a first PIN, wherein the first PIN and a second PIN are respectively used to access a user account associated with the client application that supports at least one blockchain wallet, and wherein the client application is associated with a custodial platform entity, determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN, transmitting, based at least in part on the determination and in accordance with the one or more safety protocols, an indication that notifies an external entity of a location of the user device, wherein the external entity is different from the custodial platform entity, and performing one or more further actions based at least in part on the determination and in accordance with the one or more safety protocols.

An apparatus is described. The apparatus may include one or more memories storing processor executable code, and one or more processors coupled with the one or more memories. The one or more processors may individually or collectively be operable to execute the code to cause the apparatus to receive, via a client application on a user device, a user input comprising a first PIN, wherein the first PIN and a second PIN are respectively used to access a user account associated with the client application that supports at least one blockchain wallet, and wherein the client application is associated with a custodial platform entity, determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN, transmit, based at least in part on the determination and in accordance with the one or more safety protocols, an indication that notifies an external entity of a location of the user device, wherein the external entity is different from the custodial platform entity, and perform one or more further actions based at least in part on the determination and in accordance with the one or more safety protocols.

Another apparatus is described. The apparatus may include means for receiving, via a client application on a user device, a user input comprising a first PIN, wherein the first PIN and a second PIN are respectively used to access a user account associated with the client application that supports at least one blockchain wallet, and wherein the client application is associated with a custodial platform entity, means for determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN, means for transmitting, based at least in part on the determination and in accordance with the one or more safety protocols, an indication that notifies an external entity of a location of the user device, wherein the external entity is different from the custodial platform entity, and means for performing one or more further actions based at least in part on the determination and in accordance with the one or more safety protocols.

A non-transitory computer-readable medium storing code is described. The code may include instructions executable by one or more processors to receive, via a client application on a user device, a user input comprising a first PIN, wherein the first PIN and a second PIN are respectively used to access a user account associated with the client application that supports at least one blockchain wallet, and wherein the client application is associated with a custodial platform entity, determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN, transmit, based at least in part on the determination and in accordance with the one or more safety protocols, an indication that notifies an external entity of a location of the user device, wherein the external entity is different from the custodial platform entity, and perform one or more further actions based at least in part on the determination and in accordance with the one or more safety protocols.

Some examples of the method, apparatus, and non-transitory computer-readable medium described herein may further include operations, features, means, or instructions for receiving, via the client application, one or more second user inputs that indicate the one or more safety protocols of a plurality of safety protocols, wherein transmitting the indication may be based at least in part on the one or more second user inputs.

Some examples of the method, apparatus, and non-transitory computer-readable medium described herein may further include operations, features, means, or instructions for receiving, via the client application and based at least in part on a second user input, a second indication that a user may have enabled a security feature that supports the panic PIN and receiving, via the client application, one or more third user inputs corresponding to setting the panic PIN, wherein determining that the first PIN comprises the panic PIN may be based at least in part on receiving the one or more third user inputs.

In some examples of the method, apparatus, and non-transitory computer-readable medium described herein may further include operations, features, means, or instructions for adjusting one or more configurations for the user account based at least in part on receiving the indication that the user may have enabled the security feature, wherein adjusting the one or more configurations comprises one or more of disabling biometric access to the user account, enabling a location tracking mechanism for the user, or any combination thereof.

In some examples of the method, apparatus, and non-transitory computer-readable medium described herein, performing the one or more further actions may include operations, features, means, or instructions for enabling, based at least in part on determining that the first PIN comprises the panic PIN, one or more account restrictions for the user account in accordance with the one or more safety protocols, wherein the one or more account restrictions include one or more threshold quantities of transferrable assets.

In some examples of the method, apparatus, and non-transitory computer-readable medium described herein, performing the one or more further actions may include operations, features, means, or instructions for restricting, based at in part on determining that the first PIN comprises the panic PIN, transfer of assets associated with the user account from the at least one blockchain wallet address to at least a second blockchain wallet address.

In some examples of the method, apparatus, and non-transitory computer-readable medium described herein, transmitting the indication may include operations, features, means, or instructions for transmitting the indication to the user device that hosts the client application, wherein the indication triggers a safety feature at the user device, the safety feature corresponding to notifying the external entity.

In some examples of the method, apparatus, and non-transitory computer-readable medium described herein, transmitting the indication may include operations, features, means, or instructions for broadcasting one or more beacons to the external entity.

In some examples of the method, apparatus, and non-transitory computer-readable medium described herein, the external entity comprises a law enforcement security entity, a private security entity, or any combination thereof.

In some examples of the method, apparatus, and non-transitory computer-readable medium described herein, performing the one or more further actions may include operations, features, means, or instructions for transmitting, to the client application, an indication to display, via a user interface, a message indicating that the first PIN comprises the panic PIN.

In some examples of the method, apparatus, and non-transitory computer-readable medium described herein, the message comprises a secret message including one or more code words that indicate that the first PIN comprises the panic PIN.

In some examples of the method, apparatus, and non-transitory computer-readable medium described herein, performing the one or more further actions may include operations, features, means, or instructions for transmitting, to the client application and based at least in part on transmitting the indication, a second indication that confirms transmission of the indication that notifies the external entity.

Some examples of the method, apparatus, and non-transitory computer-readable medium described herein may further include operations, features, means, or instructions for receiving, after receiving the user input, a second user input comprising the second PIN, the second PIN used to access the user account without the one or more safety protocols, deactivating, based at least in part on receiving the second PIN, the one or more safety protocols, and accessing, based at least in part on deactivating the one or more safety protocols, information associated with the user account.

Some examples of the method, apparatus, and non-transitory computer-readable medium described herein may further include operations, features, means, or instructions for transmitting, based at least in part on receiving the second user input, a second indication that notifies the external entity that the second user input comprises the second PIN.

In some examples of the method, apparatus, and non-transitory computer-readable medium described herein, performing the one or more further actions may include operations, features, means, or instructions for displaying, via a user interface of the client application, a false account balance for the user account, the false account balance comprising a configurable amount of one or more crypto tokens associated with the at least one blockchain wallet according to the one or more safety protocols.

Some examples of the method, apparatus, and non-transitory computer-readable medium described herein may further include operations, features, means, or instructions for receiving, prior to receiving the user input, one or more second user inputs indicating one or more designated beneficiaries, the one or more designated beneficiaries comprising one or more blockchain wallet addresses, wherein performing the one or more further actions comprises broadcasting, after receiving the user input, one or more messages that transfer one or more assets associated with the user account to the one or more blockchain wallet addresses based at least in part on a duration after receiving the user input satisfying a threshold duration.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, via a client application on a user device, a user input comprising a first personal identification number (PIN), wherein the first PIN and a second PIN are respectively used to access a user account associated with the client application that supports at least one blockchain wallet, and wherein the client application is associated with a custodial platform entity;

determining that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN;

transmitting, based at least in part on the determination and in accordance with the one or more safety protocols, an indication that notifies an external entity of a location of the user device, wherein the external entity is different from the custodial platform entity; and performing one or more further actions based at least in part on the determination and in accordance with the one or more safety protocols.

2. The method of claim 1, further comprising:

receiving, via the client application, one or more second user inputs that indicate the one or more safety protocols of a plurality of safety protocols, wherein transmitting the indication is based at least in part on the one or more second user inputs.

3. The method of claim 1, further comprising:

receiving, via the client application and based at least in part on a second user input, a second indication that a user has enabled a security feature that supports the panic PIN; and receiving, via the client application, one or more third user inputs corresponding to setting the panic PIN, wherein determining that the first PIN comprises the panic PIN is based at least in part on receiving the one or more third user inputs.

4. The method of claim 3, further comprising:

adjusting one or more configurations for the user account based at least in part on receiving the indication that the user has enabled the security feature, wherein adjusting the one or more configurations comprises one or more of disabling biometric access to the user account, enabling a location tracking mechanism for the user, or any combination thereof.

5. The method of claim 1, wherein performing the one or more further actions comprises:

enabling, based at least in part on determining that the first PIN comprises the panic PIN, one or more account restrictions for the user account in accordance with the one or more safety protocols, wherein the one or more account restrictions include one or more threshold quantities of transferrable assets.

6. The method of claim 1, wherein performing the one or more further actions comprises:

restricting, based at least in part on determining that the first PIN comprises the panic PIN, transfer of assets associated with the user account from the at least one blockchain wallet address to at least a second blockchain wallet address.

7. The method of claim 1, wherein transmitting the indication comprises:

transmitting the indication to the user device that hosts the client application, wherein the indication triggers a safety feature at the user device, the safety feature corresponding to notifying the external entity.

8. The method of claim 1, wherein transmitting the indication comprises:

broadcasting one or more beacons to the external entity.

9. The method of claim 1, wherein the external entity comprises a law enforcement security entity, a private security entity, or any combination thereof.

10. The method of claim 1, wherein performing the one or more further actions comprises:

transmitting to the client application, an indication to display, via a user interface, a message indicating that the first PIN comprises the panic PIN.

11. The method of claim 10, wherein the message comprises a secret message including one or more code words that indicate that the first PIN comprises the panic PIN.

12. The method of claim 1, wherein performing the one or more further actions comprises:

transmitting, to the client application and based at least in part on transmitting the indication, a second indication that confirms transmission of the indication that notifies the external entity.

13. The method of claim 1, further comprising:

receiving, after receiving the user input, a second user input comprising the second PIN, the second PIN used to access the user account without the one or more safety protocols;

deactivating, based at least in part on receiving the second PIN, the one or more safety protocols; and accessing, based at least in part on deactivating the one or more safety protocols, information associated with the user account.

14. The method of claim 13, further comprising:

transmitting, based at least in part on receiving the second user input, a second indication that notifies the external entity that the second user input comprises the second PIN.

15. The method of claim 1, wherein performing the one or more further actions comprises:

displaying, via a user interface of the client application, a false account balance for the user account, the false account balance comprising a configurable amount of one or more crypto tokens associated with the at least one blockchain wallet according to the one or more safety protocols.

16. The method of claim 1, further comprising:

receiving, prior to receiving the user input, one or more second user inputs indicating one or more designated beneficiaries, the one or more designated beneficiaries comprising one or more blockchain wallet addresses, wherein performing the one or more further actions comprises:

broadcasting, after receiving the user input, one or more messages that transfer one or more assets associated with the user account to the one or more blockchain wallet addresses based at least in part on a duration after receiving the user input satisfying a threshold duration.

17. An apparatus, comprising:

one or more memories storing processor-executable code; and one or more processors coupled with the one or more memories and individually or collectively operable to execute the code to cause the apparatus to:

receive, via a client application on a user device, one or more user inputs that indicate one or more safety protocols of a plurality of safety protocols associated with a user of the client application;

receive, via the client application, a user input comprising a first personal identification number (PIN), wherein the first PIN and a second PIN are respectively used to access a user account associated with the client application that supports at least one blockchain wallet, and wherein the client application is associated with a custodial platform entity;

determine that the first PIN comprises a panic PIN, wherein the panic PIN is associated with activation of the one or more safety protocols associated with a user of the client application and associated with at least one blockchain wallet address associated with the at least one blockchain wallet, and wherein the second PIN does not comprise the panic PIN;

transmit, based at least in part on the determination and in accordance with the one or more safety protocols, an indication that notifies an external entity of a location of the user device, wherein the external entity is different from the custodial platform entity; and perform one or more further actions based at least in part on the determination and in accordance with the one or more safety protocols.

18. The apparatus of claim 17, wherein the one or more processors are individually or collectively further operable to execute the code to cause the apparatus to:

receive, via the client application and based at least in part on a second user input, a second indication that a user has enabled a security feature that supports the panic PIN; and receive, via the client application, one or more third user inputs corresponding to setting the panic PIN, wherein determining that the first PIN comprises the panic PIN is based at least in part on receiving the one or more third user inputs.

19. A non-transitory computer-readable medium storing code, the code comprising instructions executable by one or more processors to:

receive, via a client application on a user device, a user input comprising a first personal identification number (PIN), wherein the first PIN and a second PIN are respectively used to access a user account associated with the client application that supports at least one blockchain wallet, and wherein the client application is associated with a custodial platform entity;

determine that the first PIN comprises a panic PIN, wherein the panic PIN is associated with activation of one or more safety protocols associated with a user of the client application and associated with at least one blockchain wallet address associated with the at least one blockchain wallet, and wherein the second PIN does not comprise the panic PIN;

transmit, based at least in part on the determination and in accordance with the one or more safety protocols, an indication that notifies an external entity of a location of the user device, wherein the external entity is different from the custodial platform entity; and perform one or more further actions based at least in part on the determination and in accordance with the one or more safety protocols, wherein the instructions to perform the one or more further actions are executable by the one or more processors to:

enable, based at least in part on determining that the first PIN comprises the panic PIN, one or more account restrictions for the user account in accordance with the one or more safety protocols, wherein the one or more account restrictions include one or more threshold quantities of transferrable assets.

20. The non-transitory computer-readable medium of claim 19, wherein the instructions are further executable by the one or more processors to:

receive, via the client application, one or more second user inputs that indicate the one or more safety protocols of a plurality of safety protocols, wherein transmitting the indication is based at least in part on the one or more second user inputs.

* * * * *